(No Model.) 15 Sheets—Sheet 1.

C. G. HILL.
MACHINE FOR MANUFACTURING RUCHING.

No. 387,878. Patented Aug. 14, 1888.

Fig. 1.

Witnesses:
Baltus DeLong.
Allan McLane Abert.

Inventor:
C. G. Hill
By attys.
Baldwin, Hopkins & Peyton.

(No Model.) 15 Sheets—Sheet 6.

C. G. HILL.
MACHINE FOR MANUFACTURING RUCHING.

No. 387,878. Patented Aug. 14, 1888.

Witnesses
Baltus De Long.
Allan McLane Abert.

Inventor.
C. G. Hill.
By Attys
Baldwin, Hopkins & Peyton.

(No Model.) 15 Sheets—Sheet 7.

C. G. HILL.
MACHINE FOR MANUFACTURING RUCHING.

No. 387,878. Patented Aug. 14, 1888.

*Fig: 1ª*

WITNESSES
E. A. Newman,
C. M. Newman,

INVENTOR,
Charles Grey Hill.
By his Attorneys (No Model.) 15 Sheets—Sheet 8.

C. G. HILL.
MACHINE FOR MANUFACTURING RUCHING.

No. 387,878. Patented Aug. 14, 1888.

WITNESSES.
E. A. Newman.
C. M. Newman.

INVENTOR.
Charles Grey Hill.
By his Attorneys (No Model.) 15 Sheets—Sheet 9.

C. G. HILL.
MACHINE FOR MANUFACTURING RUCHING.

No. 387,878. Patented Aug. 14, 1888.

WITNESSES.

INVENTOR.
Charles Grey Hill.
By his Attorneys (No Model.) 15 Sheets—Sheet 10.
C. G. HILL.
MACHINE FOR MANUFACTURING RUCHING.

No. 387,878. Patented Aug. 14, 1888.

WITNESSES.
E. A. Newman.
C. M. Newman.

INVENTOR.
Charles Grey Hill.
By his Attorneys (No Model.) 15 Sheets—Sheet 11.

C. G. HILL.
MACHINE FOR MANUFACTURING RUCHING.

No. 387,878. Patented Aug. 14, 1888.

WITNESSES
INVENTOR.
Charles Grey Hill,
By his Attorneys (No Model.) 15 Sheets—Sheet 12.

C. G. HILL.
MACHINE FOR MANUFACTURING RUCHING.

No. 387,878. Patented Aug. 14, 1888.

WITNESSES.
E. A. Newman
C. M. Newman

INVENTOR.
Charles Grey Hill.
By his Attorneys (No Model.)  15 Sheets—Sheet 13.
C. G. HILL.
MACHINE FOR MANUFACTURING RUCHING.

No. 387,878.  Patented Aug. 14, 1888.

WITNESSES.  INVENTOR.
E. A. Newman,  Charles Grey Hill,
C. M. Newman,  By his Attorneys (No Model.) 15 Sheets—Sheet 14.

C. G. HILL.
MACHINE FOR MANUFACTURING RUCHING.

No. 387,878. Patented Aug. 14, 1888.

Fig: 8m

WITNESSES.
E. A. Newman,
C. M. Newman,

INVENTOR.
Charles Grey Hill,
By his Attorneys (No Model.) 15 Sheets—Sheet 15.

C. G. HILL.
MACHINE FOR MANUFACTURING RUCHING.

No. 387,878. Patented Aug. 14, 1888.

Fig: 8ª

WITNESSES.
E. A. Newman,
C. M. Newman,

INVENTOR.
Charles Grey Hill,
By his Attorneys

UNITED STATES PATENT OFFICE.

CHARLES GREY HILL, OF ARNOT HILL, COUNTY OF NOTTINGHAM, ENGLAND.

MACHINE FOR MANUFACTURING RUCHING.

SPECIFICATION forming part of Letters Patent No. 387,878, dated August 14, 1888.

Application filed September 20, 1886. Serial No. 214,043. (No model.) Patented in England December 1, 1885, No. 14,776, and in France April 7, 1886, No. 175,326.

*To all whom it may concern:*

Be it known that I, CHARLES GREY HILL, a subject of the Queen of Great Britain, residing at Arnot Hill, in the county of Nottingham, England, have invented certain new and useful Improvements in Machines for Manufacturing Frilling or Ruching, (for which Letters Patent No. 14,776, dated December 1, 1885, have been granted to me in Great Britain, and Letters Patent of addition of September 11, 1886, on patent of April 7, 1886, No. 175,326, have been granted to me in France,) of which the following is a specification.

In my application, Serial No. 214,042, for Letters Patent of the United States, filed simultaneously herewith, I have described means for the production of frillings and ruchings. The frilling or ruching consists of plaited or goffered fabric set into a band, and to form the frill it is deflected or bent inward at regular intervals and retained or set in the form so given to it. The means to this end therein set forth, and hereinafter described and claimed, differ in essential features.

Now, in accordance with my present invention, a like result is attained by means of mechanical fingers operating on the frill while it is supported upon the periphery of a drum, the said fingers being so controlled as to cause them to carry the frill downward or inward toward the axis of the drum, and then to tuck it beneath the edge of the supporting-surface.

Fig. 1ª is a view in perspective. Fig. 8° is a diagram representing the face of the controlling-cam, and on it are marked lines $8^a$ to $8^m$, inclusive, showing the positions corresponding to the series of fingers similarly marked.

Figure 1:
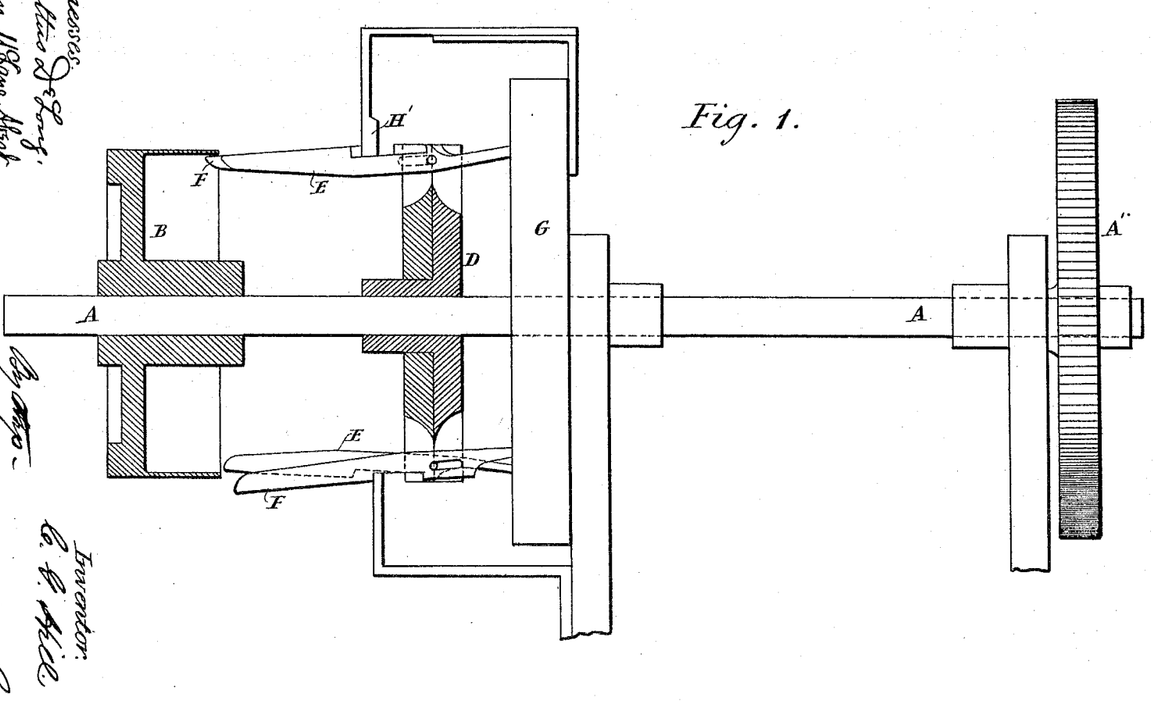
Figure 1 is a vertical section of a machine for forming frilling and ruchings in this manner.

In Fig. 1 and the subsequent figures, A is an axis, which is rotated by means of a spur-wheel, A', at its end, and a pinion driven in any convenient way gears with this wheel. B is a drum on the axis A and constituting the supporting-surface for the frilling or ruching.

Figure 4:
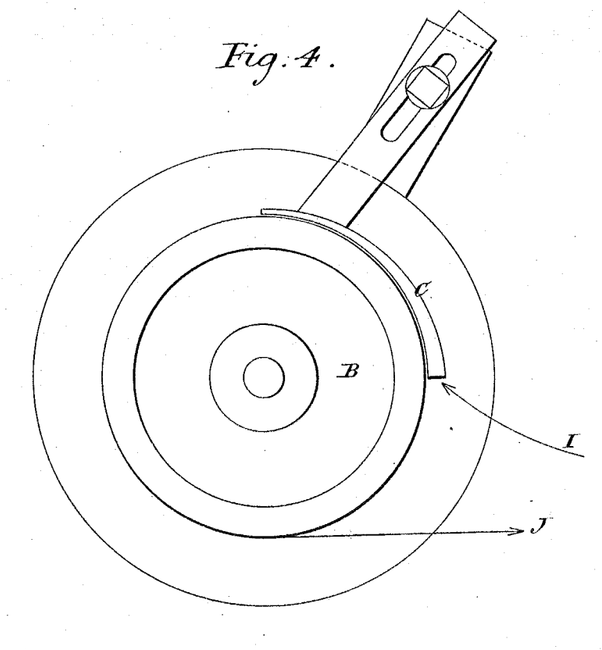
Fig. 4 shows parts at the other end of the machine.
Figures 5, 6, 7, 8:
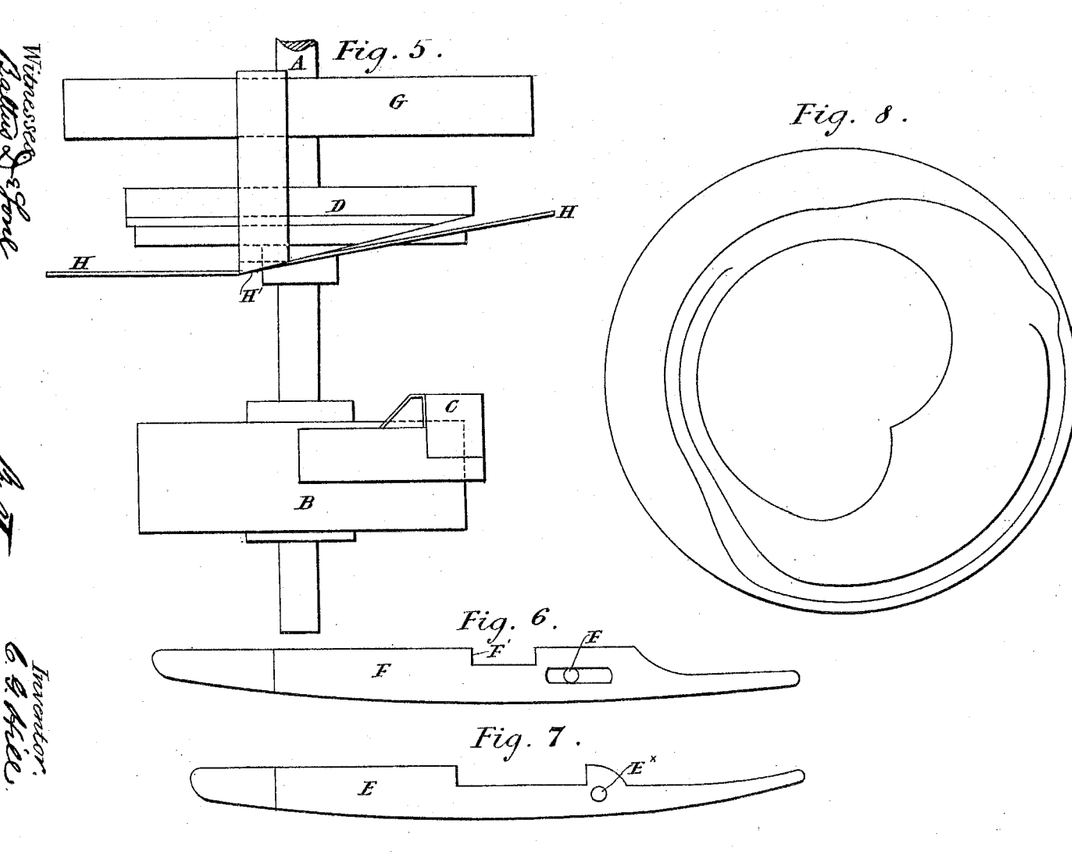
Fig. 5 shows parts in plan.
Figs. 6 and 7 show the fingers separately and full size.
Fig. 8 shows a face view of the stationary cam for controlling the fingers. Figs. $8^a$, $8^b$, $8^c$, $8^d$, $8^e$, $8^f$, $8^g$, $8^h$, $8^i$, $8^j$, $8^k$, $8^l$, and $8^m$ show the different positions which the fingers assume as they travel around, and in each figure the portion of the cam then controlling the fingers is shown in section.
Figure 8:
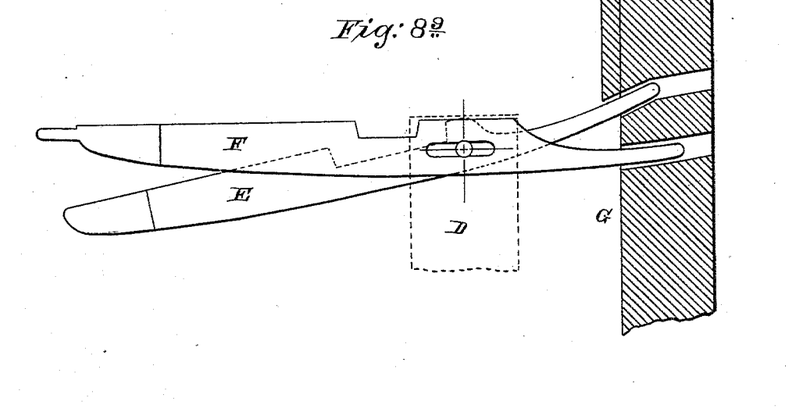
Figure 8C:
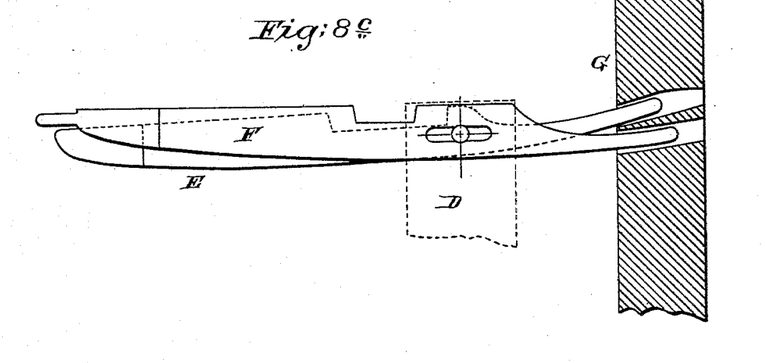
Figure 8D:
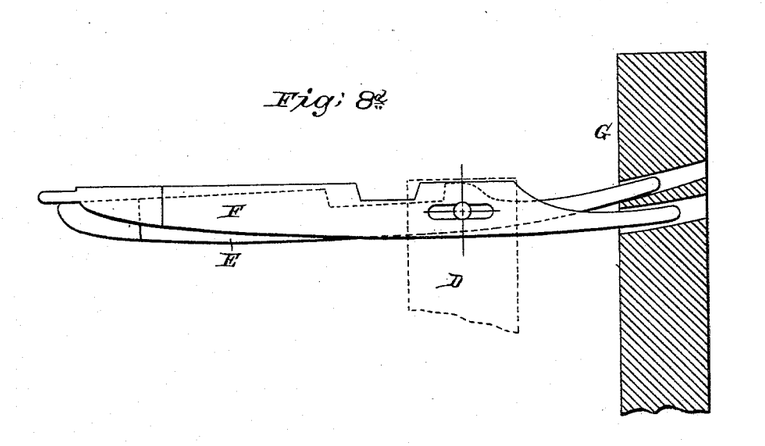
Figure 8E:
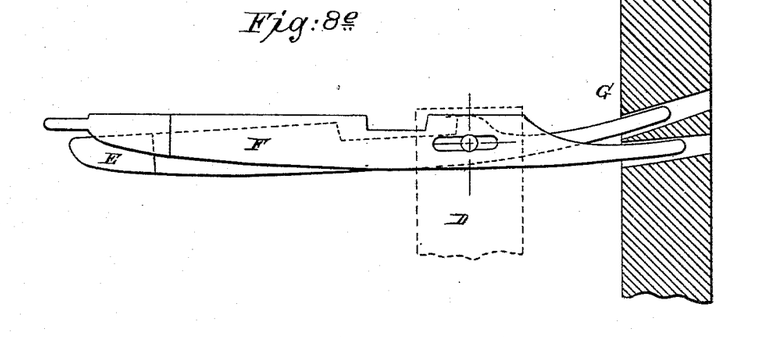
Figure 8F:
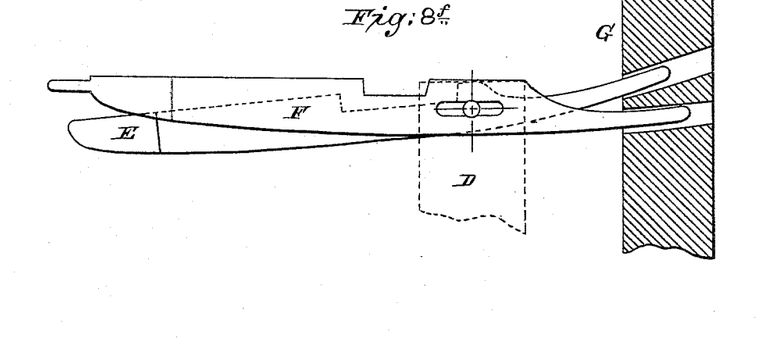

C is a guide through which the frilling or ruching, as shown by Fig. 4, is led onto the upper surface of the drum, so that the band into which the frilling or ruching is set rests on the periphery of the drum, while the frill overhangs its edge.

Figure 3:
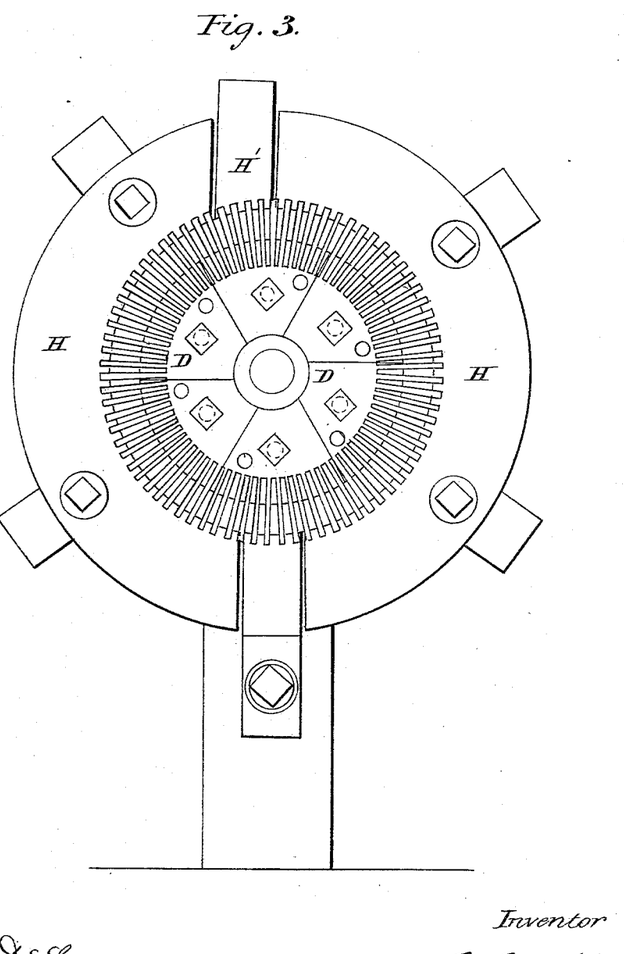
Fig. 3 is an end elevation with the drum removed.

D is a head fixed on the axis A. It is built up in parts, as shown in Fig. 3, and there are a number of radial openings in it, in which the fingers E and F are carried.

$E^x$ and $F^x$ are short pins held in the head D and serving as axes about which the fingers can turn. The fingers F are slotted, as shown, so that they can slide longitudinally as well as turn; but the fingers E can only turn.

G is the stationary cam by which the fingers are governed as far as concerns the movement of their outer ends to and from the axis.

H is a stationary inclined plate, against which comes a shoulder, F', on the fingers F, and thrusts them forward at a suitable time and retains them when they are so placed.

Figure 2:
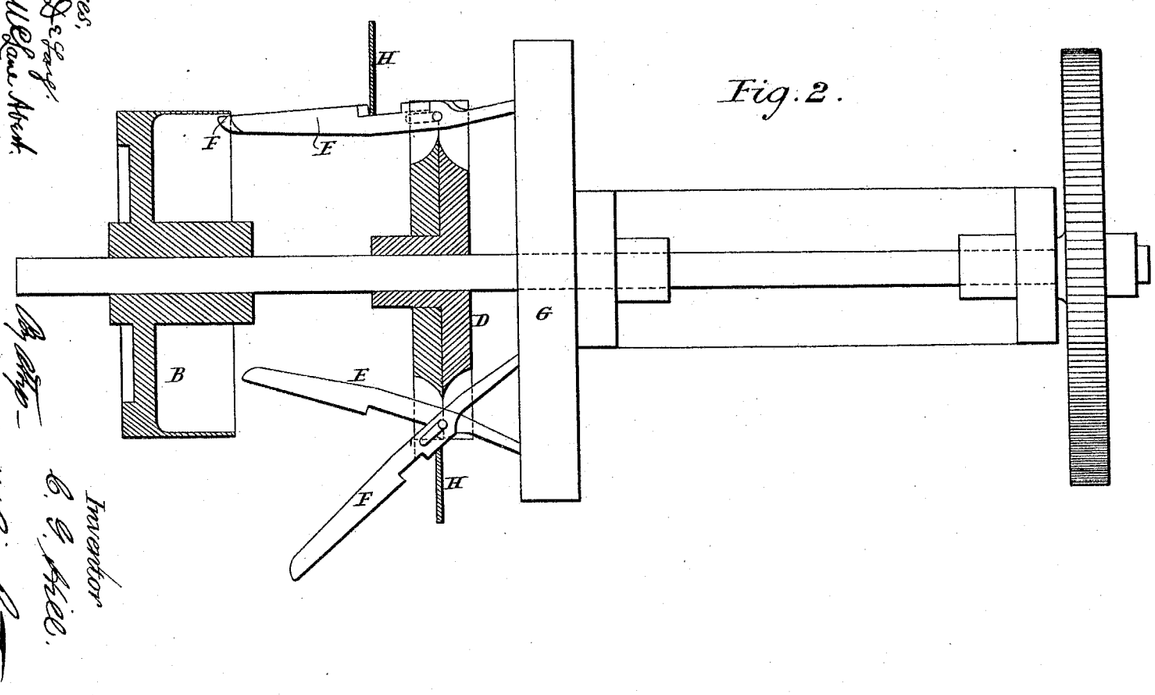
Fig. 2 is a horizontal section.

The method of working is as follows: The rotation of the drum B and head D, carrying with it the fingers E and F, causes the frilling to be drawn forward through the guide C. In the neighborhood of the entrance end of the guide the fingers E and F are open apart, scissors-like, as seen in Fig. 2, the outer ends of the fingers F being outside the rim of the drum B, while the outer ends of the fingers E are within it. The fingers E and F are arranged alternately all around the circle. As the head D revolves, carrying the fingers with it, the outer fingers, F, fall down onto the frill and displace it. The outer ends of these fingers then pass under the guide-wire C' at the top of the drum (seen in Fig. 1ª) and nip the frill just before arriving at the top of the drum. They then thrust it in under the drum-rim just after passing the center. This is effected by the incline at H' operating against the shoulders F' of the fingers. The frill then takes a serpentine course under the fingers F and over the fingers E, the fingers all being side by side, and in this position the fingers remain for some time. When vertically under the axis, the fingers F are drawn back by the lower incline of the plate H, and when released the ends of the fingers F fall outward away from the drum. The successive positions assumed by the fingers are very fully shown by Figs. $8^a$ to $8^m$, inclusive. While the frill is held between the fingers it passes a minute jet of steam and the steam plays upon it. The drum B is heated by a gas-flame in contact with its axis, and the heat of the drum is sufficient to set the frill after it has been steamed before the fingers release it.

The arrow I in Fig. 4 shows the direction in which the frilling or ruching is fed into the machine onto the drum, and the arrow J shows the direction in which it is drawn off.

Sometimes I dispense with the pivoted fingers E, and in place thereof provide an equivalent set of fingers formed by comb-like teeth on the periphery of the drum.

Figure 9:
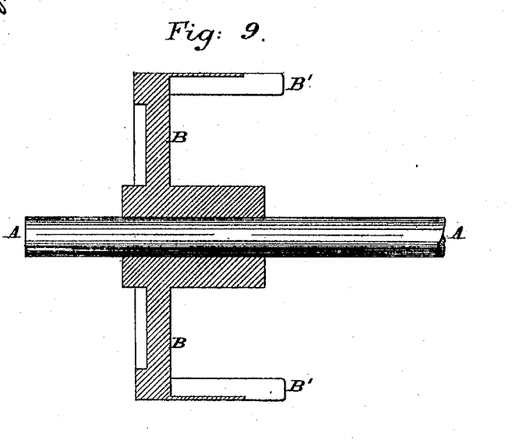
Figs. 9 and 10 illustrate a modification and show a section and elevation of the supporting-drum.
Figure 10:
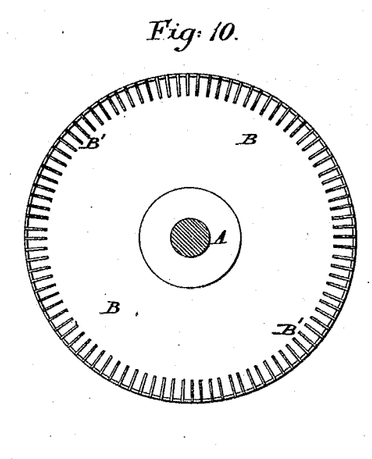

Fig. 9 is a section, and Fig. 10 is an end elevation, of a drum so made. B' B' are the teeth on the drum. The fingers F F carry down the frill between these teeth and tuck it in beneath the periphery of the drum, as already described. The steaming and drying then are performed, as already described.

I claim—

1. The combination of the revolving supporting-surface for the frilling or ruching, the cam G, the two sets of fingers, both having a vibrating movement, and the revolving head for carrying the same, one set of the said fingers having also an endwise movement, and means, substantially as described, for securing said endwise movement, whereby the frill is carried down and tucked in beneath the edge of the supporting-surface and so held while it is set in form, substantially as set forth.

2. The combination, in a machine for forming frilling or ruching, of the revolving drum B, the guide C, the revolving head D, the fingers E and F, means for closing the fingers together to embrace the fabric between them, the cam G, and the incline H, substantially as described.

3. The combination of the driving-shaft, the revolving supporting-drum, the guide thereon, the revolving head fixed to the driving-shaft, the fingers F, mounted on the revolving head, means, substantially as described, for giving said fingers a vibratory and an endwise movement relatively to the supporting-drum, the fingers E, mounted on the head, and means, substantially as described, for giving said fingers a vibratory movement relatively to the drum, substantially as set forth.

London, September 6, 1886.

CHARLES GREY HILL.

Witnesses:
JNO. WIGHTMAN,
  17 *Villa Road, Nottingham.*
ERNEST LIDDELL,
  17 *Gracechurch St, London, E. C.*